United States Patent [19]

Mancinelli

[11] Patent Number: 4,678,837
[45] Date of Patent: Jul. 7, 1987

[54] MULTILITHIUM POLYMERIZATION INITIATORS

[75] Inventor: Paul A. Mancinelli, Aston, Pa.

[73] Assignee: Atlantic Richfield Company, Los Angeles, Calif.

[21] Appl. No.: 768,670

[22] Filed: Aug. 23, 1985

[51] Int. Cl.$^4$ .................. C08F 2/00; C08F 297/04
[52] U.S. Cl. ...................... 525/250; 525/193; 525/271; 525/314; 526/173; 526/175
[58] Field of Search ............ 525/250, 271, 314, 193; 526/173, 175

[56] References Cited

U.S. PATENT DOCUMENTS

| | | | |
|---|---|---|---|
| 3,644,322 | 2/1972 | Farrar | 526/173 |
| 3,957,913 | 5/1976 | Roest et al. | 525/271 |
| 4,409,368 | 10/1983 | Vitus et al. | 525/314 |
| 4,482,677 | 11/1984 | Teranaka et al. | 525/250 |

*Primary Examiner*—Wilbert J. Briggs, Sr.
*Attorney, Agent, or Firm*—Lewis J. Young

[57] ABSTRACT

An alternate procedure for preparing multilithium initiators using DVB has been developed in order to achieve better control over the specific number of anionic sites per initiator molecule and to prepare star-block copolymers having a pre-determined number of branches. The process consists of 3 distinct steps; oligomerization, activation and polymer growth. The initial step involves the oligomerization of DVB yielding a mini-block having a predetermined number of pendant vinyl groups using a monofunctional initiator such as polystyryllithium. This is quickly followed by activation of the pendant vinyl groups using s-butyllithium prior to polymer growth.

8 Claims, No Drawings

MULTILITHIUM POLYMERIZATION INITIATORS

BACKGROUND OF THE INVENTION

The present invention relates to an alternate route to star-block formation in anionic polymerization involving the use of multifunctional initiators.

Highly branched block copolymers, sometimes called star-block copolymers, are known in the art of anionic polymerization. These star-block copolymers are prepared by first forming linear block polymers having an active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound. In the case where the polyfunctional compound is divinylbenzene, the coupling reaction results in a star-block having several arms and a cluster of living anionic species at the nucleus of the star. It is at this point that the reactive star anions are terminated by reaction with proton active reagents, such as alcohols, to yield the final polymer.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinylbenzene gave star-block copolymers having polydivinylbenzene nuclei and several identical arms of polybutadiene branching therefrom. The arms can also be either random or block copolymers of styrene and butadiene (from A-B-Li blocks, where A is polystyrene segment) where the diene is the major component.

Farrar, U.S. Pat. No. 3,644,322, teaches to make star-block copolymers having several arms wherein half of the arms are grown out from the multi-lithiated nucleus and then terminated.

Bean et al, U.S. Pat. No. 3,651,025, teaches the same procedure as Farrar, but forming different arms in the growth from the multi-lithiated nucleus.

Farrar, U.S. Pat. No. 3,787,510, is a division of U.S. Pat. No. 3,644,322 above, claiming the multilithium nucleus prior to growing the other half of the arms.

Crossland et al, U.S. Pat. No. 4,010,226, teaches to form star-block copolymers using divinylbenzene as coupling agent, growing new arms from this star-block copolymers, which arms are 5000 to 1,000,000 molecular weight and then capping these longer arms at the extremities away from the nucleus with various reagents which react with the carbon-to-lithium bonds.

SUMMARY OF THE INVENTION

It has now been found that star-block copolymers can be prepared by an alternate route involving the use of multifunctional initiators. The initiators are prepared by oligomerization of a polyvinyl aromatic compound to give a mini-block containing a pre-determined number of branches using a monofunctional anionic initiator. This mini-block is immediately activated by adding s-butyllithium to these branches. The resulting multilithium initiator is then used to initiate the polymerization of conjugated diene and/or vinyl aromatic monomer to form a starblock copolymer having a pre-determined number of arms.

DETAILED DESCRIPTION OF THE INVENTION

The process of the invention consists essentially of (a) oligomerization of a polyvinyl aromatic compound using a first organomonolithium initiator to form a mini-block having a pre-determined number of pendant vinyl groups; (b) rapid activation of the pendant vinyl groups by the addition of stoichiometric amounts of a second organomonolithium initiator, to form a multilithium initiator having a pre-determined number of active sites; (c) addition of conjugated diene monomer and/or vinyl aromatic monomer to form the arms of a star-block copolymer; and (d) termination of the copolymer arms to recover said star-block copolymer.

The polyvinyl aromatic compounds useful in oligomerization are preferably the divinylbenzenes such as ortho-, meta-, or para-divinylbenzene, or mixtures thereof. The polyvinyl naphthalenes and polyvinyl biphenyls can also be used.

The organomonolithium initiators useful in the invention are the known alkyllithium compounds, such as methyllithium, n-butyllithium, sec-butyllithium; the cyclo-alkyllithium compounds, such as cyclo-hexyllithium; and the aryllithium compounds, such as phenyllithium, p-tolyllithium and naphthyllithium. A preferred initiator for the oligomerization step is a polystyryllithium compound wherein the polystyryl anion has a number average molecular weight of from 10,000 to 30,000.

The oligomerization step utilizes polyvinyl aromatic compound/lithium initiator ratios of 3 to 6. Theoretically these ratios should produce mini-blocks having 3 to 6 pendant vinyl groups.

Activation of the pendant vinyl groups is accomplished by immediate addition of a second initiator, preferably sec-butyllithium, in stoichiometric amounts. This brings the total polyvinyl aromatic compound/lithium initiator ratio down to between 0.75 and 0.90 and forms multilithium initiators having 4 to 7 active sites. Growth of polymer chains and final termination produces star-block polymers having 4 to 7 arms. The efficiency of the activation can be varied by changing the polyvinyl aromatic compound/lithium initiator ratio between 0.5 and 1.0.

The polymers of this invention are star-block copolymers of from 0 to 100% by weight of a monovinyl aromatic compound and 0 to 100% by weight of a conjugated diene of 4 to 8 carbon atoms and said star-block copolymers having at least three arms connected to a polyvinyl aromatic compound nucleus.

The polymerization is conducted in an inert hydrocarbon solvent such as isobutane, pentane, cyclohexane, cyclopentane, benzene, toluene, xylene and the like. The polymerization is carried out in the absence of air, moisture, or any other impurity which is known to be detrimental to anionic catalyst systems. The temperature of polymerization may be conventionally from 0° to 120° C., and preferably between 40° and 80° C.

The molecular weights of the various arms will normally vary between 10,000 and 200,000, but may be larger.

The structure of the arms of the star-block copolymers can be of any of the known block structures made up of poly (vinyl aromatic monomer) and/or poly (conjugated diene). Included in these structures are the homopolymer blocks, the true copolymer blocks, the random copolymer blocks, the tapered copolymers blocks and mixtures of these.

The monovinyl aromatic compound useful in the invention is preferably styrene, but may be alkyl substituted styrenes which have similar copolymerization characteristics, such as, alphamethylstyrene and the ring substituted methyl-styrenes, ethylstyrenes, and t-butylstyrene.

The amount of monovinyl aromatic compound useful in the invention is between 0 and 100% by weight based on total monomers. Compositions containing from 0 to 55% by weight have properties of thermoplastic elastomers, whereas those containing from 55 to 100% by weight have properties of thermoplastic resins.

of 1.4 M s-BuLi in cyclohexane (3.7 mmoles) was added via syringe. This solution was allowed to react for 10 minutes to activate the pendant vinyl groups and form a multilithium initiator. Then 102 ml (92.4 g) of styrene was added. The solution turned orange indicating the polymerization of styrene. The styrene step lasted 45 minutes before termination with 2 ml of methanol. Contents of the reactor were stored in a one-gallon glass jar containing 2.0 gm of 2,6-ditert-butyl-4-methylphenol (BHT). This general procedure was used in all experiments listed in Table I. In all cases an amount of styrene monomer was added to give a theoretical number average molecular weight of 20,000 to the polystyrllithium initiator.

TABLE I

| | Oligomerization Step* | | | Activation Step* s-BuLi | | Polymer Growth Step* | | | |
|---|---|---|---|---|---|---|---|---|---|
| Run | PSLi Conc. (mmol) | DVB Conc. (mmol) | DVB/Li | Reaction Time (sec) | Initiator Charge (mmol) | Final DVB/Li | % Solids | PSMW | % of Total | No. of Branches |
| 1 | 1.9 | 7.6 | 4 | 5 | 8.96 | 0.7 | 7.5 | 38,500 | 67 | 2 |
| | | | | | | | | 55,600 | 33 | 3.6 |
| 2 | 1.9 | 7.6 | 4 | 10 | 8.96 | 0.7 | 7.5 | 40,200 | 69 | 2 |
| | | | | | | | | 61,900 | 31 | 4 |
| 3 | 1.3 | 7.6 | 6 | 10 | 9.6 | 0.7 | 7.0 | 46,700 | 76 | 2.5 |
| | | | | | | | | 65,700 | 24 | 4.5 |
| 4 | 2.04 | 8.15 | 4 | 10 | 8.8 | 0.75 | 7.7 | 47,800 | 68 | 2.5 |
| | | | | | | | | 86,700 | 32 | 6.5 |
| 5 | 2.26 | 8.5 | 4 | 10 | 8.6 | 0.8 | 7.9 | 51,800 | 58 | 3 |
| | | | | | | | | 80,800 | 42 | 6 |
| 6 | 2.15 | 8.6 | 4 | 10 | 8.6 | 0.8 | 7.9 | 54,000 | 57 | 3 |
| | | | | | | | | 80,000 | 43 | 6 |
| 7 | 2.31 | 9.2 | 4 | 10 | 8.5 | 0.85 | 7.9 | 43,800 | 60 | 2 |
| | | | | | | | | 78,200 | 40 | 5.5 |
| 8 | 2.44 | 9.7 | 4 | 10 | 8.3 | 0.9 | 8.1 | 51,800 | 53 | 3 |
| | | | | | | | | 84,800 | 47 | 6 |
| 9 | 0.92 | 3.7 | 4 | 15 | 3.7 | 0.8 | 5.8 | 60,200 | 44 | 2 |
| | | | | | | | | 122,000 | 56 | 5 |
| 10 | 0.92 | 3.7 | 4 | 15 | 3.7 | 0.8 | 5.8 | 55,700 | 66 | 2 |
| | | | | | | | | 163,000 | 34 | 7 |
| 11 | 1.04 | 4.15 | 4 | 15 | 3.6 | 0.9 | 6.0 | 55,000 | 44 | 2 |
| | | | | | | | | 163,000 | 56 | 7 |

*at 60° C. Activation reaction time 10 minutes.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

After the arms have been formed by polymerization of the vinyl aromatic monomer or conjugated diene or both, either sequentially or simultaneously, these living anionic species are terminated with proton active substances, such as alcohols, to yield the protonated polymers.

The following examples, in which percentages are by weight unless otherwise specified, are not intended to limit the scope of the invention.

EXAMPLE I

Into a one-gallon reactor filled with 2300 ml of cyclohexane at 60° C. was added 20.3 ml (18.4 g) of styrene. s-BuLi was added dropwise via syringe to the stirring solution until a faint orange color developed and persisted. While maintaining stirring 0.66 ml of 1.4 M s-BuLi in cyclohexane (0.92 mmoles) was then charged. Polymerization was allowed to occur for 20 minutes before sampling to determine initiator molecular weight which was 20,000. Following the divinylbenzene initiator preparation step 0.97 ml of divinylbenzene (DVB) (3.7 mmoles) was added via syringe. The solution was allowed to react for precisely 15 seconds to form a mini-block having 4 pendant vinyl groups. Then 2.64 ml It will be noted that products of Runs 1-8 have the number of arms having 10,000 Mn shown in the last column of Table I plus one arm of 20,000 from the multilithium initiator. Similarly, the products of Runs 9-11 have the number of arms having 20,000 Mn plus one more arm of 20,000 from the initiator. Thus, although the range of arms is designated by showing a percentage of 2 points of the spectrum, a total spectrum of arm number between 2 and 7 are present. Counting the initiator arm, actually, star-block polymer having between 3 and 8 arms per molecule are obtained.

EXAMPLE II

Preparing S/B Elastomers Using Multilithium Initiators

Into a one-gallon reactor filled with 2300 ml of cyclohexane at 60° C. was added 20.3 ml (18.4 g) of styrene. s-BuLi was added dropwise via syringe to the stirring solution until a faint orange color developed and persisted. While maintaining stirring 0.66 ml of 1.4 M s-BuLi in cyclohexane (0.92 mmoles) was then charged. Polymerization was allowed to occur for 20 minutes before sampling to determine initiator molecular weight which was 20,000. Following the DVB initiator preparation step 0.97 ml of DVB (3.7 mmoles) was added via syringe. The solution was allowed to react for precisely 15 seconds to form a mini-block having 4 pendant vinyl groups. Then 2.64 ml of 1.4 M s-BuLi in cyclohexane (3.7 mmoles) was added via syringe. This solution was allowed to react for 10 minutes to activate the pendant groups and form a multilithium initiator. Then 172.9 ml (108.5 g) of butadiene was added. Upon addition of the butadiene the solution turned from bright red to creamy white. Polymerization took place for one hour with increasing solution viscosity before 102 ml (92.4 g) of styrene was added. The solution stayed creamy white for an additional 30 minutes before changing over to orange indicating the slower than anticipated butadiene polymerization kinetics. The styrene step lasted 45 minutes before termination with 2 ml of methanol. Contents of the reactor were stored in a one-gallon glass jar containing 2.0 gm of BHT. This general procedure was used in all experiments listed in Table II. The final copolymers were analyzed and found to have one polystyrene arm of 20,000 molecular weight and the number of arms listed in Table II, which arms have a polybutadiene block of 23,484 $M_n$ attached to the nucleus, followed by a polystyrene block of 20,000 $M_n$. Although the samples actually had a broad distribution of arm numbers from 2 to 6, the Table reflects the distribution by showing only a bimodal distribution. It can be seen that increases in DVB reaction time (from 15 to 20 seconds) and the final DVB/Li ratio (from 0.8 to 0.9) resulted in an increase in branching efficiency.

TABLE II

| | Oligomerization Step* | | | Activation Step* s-BuLi Initiator Charge (mmol) | | Polymer Growth Step* | | | |
|---|---|---|---|---|---|---|---|---|---|
| Run | PSLi Conc. (mmol) | DVB Conc. (mmol) | DVB/ Li | Reaction Time (sec) | | Final DVB/Li | % Solids | MW | & of Total | No. of Branches |
| 1 | 0.92 | 3.7 | 4 | 15 | 3.7 | 0.8 | 10.9 | 128,710 | 75 | 2.5 |
| | | | | | | | | 259,162 | 25 | 5.5 |
| 2 | 0.92 | 3.7 | 4 | 15 | 3.7 | 0.8 | 10.9 | 128,710 | 74 | 2.5 |
| | | | | | | | | 237,420 | 26 | 5 |
| 3 | 1.04 | 4.15 | 4 | 15 | 3.6 | 0.9 | 11.0 | 139,581 | 62 | 2.75 |
| | | | | | | | | 280,904 | 38 | 6 |
| 4 | 0.92 | 3.7 | 4 | 20 | 3.7 | 0.8 | 10.9 | 128,710 | 58 | 2.5 |
| | | | | | | | | 259,162 | 42 | 5.5 |

*at 60° C. Activation reaction time 10 minutes. All polymer arms had S/BD ratio of 46/54 with 20,000 $M_n$ S-blocks.

What is claimed is:

1. A process for forming star-block copolymers having a pre-determined number of arms, consisting essentially of
   (a) oligomerization of 3 to 6 moles of a polyvinyl aromatic compound using one mole of a first organomonolithium initiator to form a mini-block having a pred-determined number from 3 to 6 of pendant vinyl groups;
   (b) activation within 5 to 20 seconds of the pendant vinyl groups by the addition of stoichiometric amounts of a second organomonolithium initiator to form a multi-lithium initiator having pre-determined number of active sites;
   (c) addition of 0–100% by weight based on total monomer of conjugated diene monomer and/or 100–0% by weight based on total monomer of vinyl aromatic monomer to form a star-block block copolymer; and
   (d) termination of the copolymer to recover said star-block copolymer.

2. The process of claim 1 wherein said first organomonolithium initiator in part (a) is a polystyryllithium having a number average molecular weight of 10,000 to 30,000, and said second organomonolithium initiator in part (b) is sec-butyllithium.

3. The process of claim 1 wherein vinyl aromatic monomer is added to said multilithium initiator to form poly(vinyl aromatic monomer) arms in said star-block copolymer.

4. The process of claim 1 wherein conjugated diene monomer is added to said multilithium initiator to form poly(conjugated diene monomer) arms in said star-block copolymer.

5. The process of claim 1 wherein conjugated diene monomer and vinyl aromatic monomer are added sequentially to said multilithium initiator to form true block copolymer arms in said star-block copolymer.

6. The process of claim 1 wherein a mixture of conjugated diene monomer and vinyl aromatic monomer is added to said multilithium initiator to form tapered copolymer arms in said star-block copolymer.

7. The process of claim 1 wherein a mixture of conjugated diene monomer, vinyl aromatic monomer and a polar activator is added to said multilithium initiator to form random block copolymer arms in said star-block copolymer.

8. The process of claim 1 wherein said conjugated diene monomer has from 4 to 8 carbon atoms in the molecule and is selected from the group consisting of 1,3-butadiene, isoprene, 2,3-dimethyl-1,3-butadiene, piperylene, and mixtures thereof and said vinyl aromatic monomer is selected from the group consisting of styrene, alpha-methylstyrene, ring-substituted methylstyrene, ethylstyrene, t-butylstyrene and mixtures thereof.

* * * * *